(12) United States Patent
Li et al.

(10) Patent No.: US 12,436,973 B2
(45) Date of Patent: Oct. 7, 2025

(54) DATA TAGGING AND PROMPT GENERATION SYSTEM

(71) Applicant: SAP SE, Walldorf (DE)

(72) Inventors: Jing-tao Li, Shaanxi (CN); Jian Song, Xi'an (CN); Ming Yan, Shaanxi (CN); Jingyuan Li, Xi'an (CN); Bo Dang, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/383,557

(22) Filed: Oct. 25, 2023

(65) Prior Publication Data

US 2025/0139128 A1  May 1, 2025

(51) Int. Cl.
*G06F 16/00* (2019.01)
*G06F 16/2458* (2019.01)
*G06F 16/28* (2019.01)

(52) U.S. Cl.
CPC ........ *G06F 16/285* (2019.01); *G06F 16/2462* (2019.01)

(58) Field of Classification Search
CPC .............. G06F 16/285; G06F 16/2462
USPC .......................................... 707/738
See application file for complete search history.

(56) References Cited

U.S. PATENT DOCUMENTS

| 11,516,158 B1 * | 11/2022 | Luzhnica | G06F 40/35 707/707 |
| 2019/0258904 A1 * | 8/2019 | Ma | G06F 18/24133 707/707 |

* cited by examiner

*Primary Examiner* — Alexandria Y Bromell
(74) *Attorney, Agent, or Firm* — Sterne, Kessler, Goldstein & Fox P.L.L.C.

(57) ABSTRACT

System, method, and various embodiments for data tagging and prompt generation are described herein. An embodiment operates by receiving input data, identifying metadata, generating one or more statistics based on the input data, calculating a sample size for the input data based on the one or more statistics and extracting a sample of the input data of the sample size. A prompt is generated based on a prompt template, and the prompt is provided to a language model configured to tag the input in accordance with the prompt. The output including tagged input data is received, and a query is executed against the tagged input data.

20 Claims, 6 Drawing Sheets

DATA TAGGING AND PROMPT GENERATION SYSTEM

BACKGROUND

Tagging data provides semantic meaning, making data easier to discover and understand. High-quality tags can help unleash the power of data. Manual tagging can be performed on a small data set. However, tagging large-scale enterprise data poses significant challenges. Manual tagging or semi-supervised learning methods require extensive labor and computing resources, and are highly inefficient, and can be inaccurate. Existing supervised learning approaches based on traditional neural networks have limitations, including the need for pre-training, constraints on predefined types and room for improvement in tag quality, which again consumes computing resources during the pre-training processes.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a data tagging and prompt generation system.

Tagging data provides semantic meaning, making data easier to discover and understand. High-quality tags can help unleash the power of data. Manual tagging can be performed on a small data set. However, tagging large-scale enterprise data poses significant challenges. Manual tagging or semi-supervised learning methods require extensive labor and computing resources, and are highly inefficient, and can be inaccurate. Existing supervised learning approaches based on traditional neural networks have limitations, including the need for pre-training, constraints on predefined types and room for improvement in tag quality, which again consumes computing resources during the pre-training processes.

Figure 1:
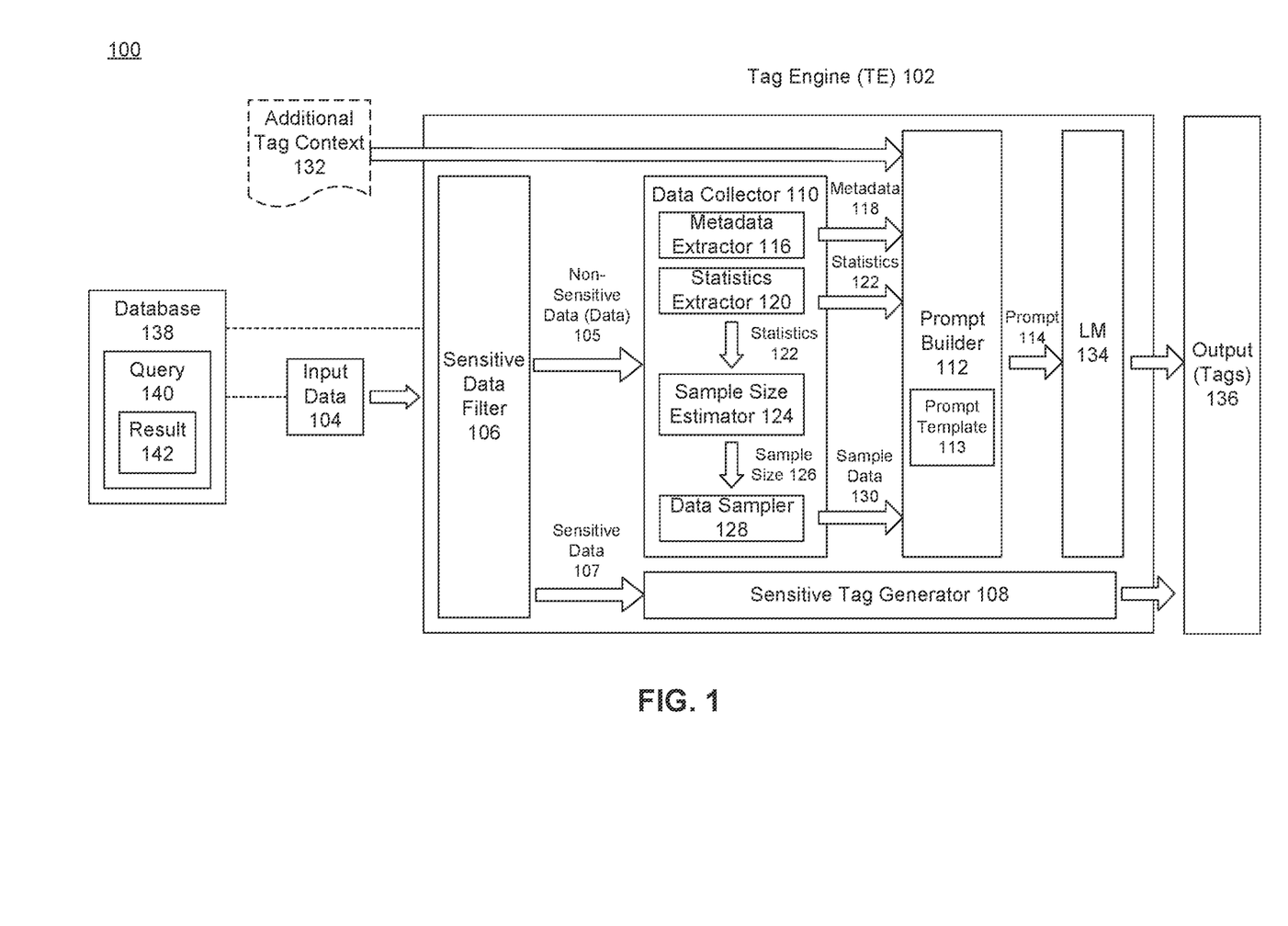
FIG. 1 is a block diagram illustrating example functionality for tag engine (TE), according to some embodiments.

FIG. 1 is a block diagram 100 illustrating example functionality for tag engine (TE) 102, according to some embodiments. TE 102 automates the tagging of data, adding semantic context to the data, that makes the tagged data easier to discover, query, and understand (relative to the data before the tagging). TE 102 utilizes fewer computing resources and manual labor than manual tagging and semi-supervised learning, with greater accuracy and consistency in producing high quality tags.

TE 102 may also reduce the processing required for generating and tagging the data, by only using a sample of the input data set to generate the tags, and then applying those tags to the full data set. In some embodiments, TE 102 may allow a user to provide additional information that may be used to further enhance the accuracy of the inferred or generated tags from the sample data set.

In some embodiments, TE 102 may receive input data 104 from a user. For example, a user may select a table (or set of tables, data across multiple tables, or other data) from a database as input data 104. For the sake of simplicity, the example of a table selection as input data 104 will be used as examples throughout this Specification. The table of input data 104 may include various columns with data stored in rows under the columns.

In some embodiments, one or more of the columns may include unknown data. For example, the columns may not have column names or may have inaccurate column names that do not accurately capture what data is stored in a particular column. In some embodiments, data tagging by TE 102 may be used to add accurate or more accurate column names to the columns of the input data 104. In some embodiment, TE 102 may generate metadata that is stored with the columns which help enhance the searchability of the data of the various columns.

In some embodiments, a sensitive data filter 106 may process the input data 104, and distinguish between sensitive data and non-sensitive data. In some embodiments, sensitive data filter 106 may identify sensitive data 107 from the input data 104 as being any data with personally identifiable information (PII). Some examples of PII may include name, social security number, credit card number, date of birth, and home address. In some embodiments, sensitive data filter 106 may rely on pattern matching to identify sensitive data. For example, a social security number may be formatted in a pattern of xxx-xx-xxxx Sensitive data filter 106 may be configured to comply with privacy regulations or security policies which may be unique for different organizations, data sets, and geographic regions.

In some embodiments, sensitive data filter 106 may mask the PII by removing or replacing certain characters. For example, "John Smith" may be masked as "J Smith" or "J* Sm*" or "J+++ Smith". In some embodiments, TE 102 may then process the masked data with the non-sensitive data 105 (referred to generally as data 105) as described in further detail below. In some embodiments, the sensitive data 107 may be removed from the input data 104 and processed separately by a sensitive tag generator 108. Sensitive tag generator 108 may tag the data as 'sensitive' and bypass processing with regards to data 105 as described below.

The non-sensitive data 105 (e.g., input data 104 after sensitive data 107 has been extracted or masked) may then be accessed by a data collector 110. Data collector 110 may perform data processing to identify, generate, or extract data that is going to be used to generate a prompt 114 by a prompt builder 112.

In some embodiments, the data 105 may include both an asset and one more elements. Asset may refer to a generalized group of data, and elements may refer to subsections of that data. For example, data 105 may include a table (asset), and one or more columns (elements). In other embodiments, data 105 may only include an element (e.g., a single column).

In some embodiments, a metadata extractor 116 may identify or extract metadata 118 from the data 105. Metadata 118 may include any information about data 105. Example metadata 118 may include an asset name, an asset description, an element name, an element description, and any existing tags on the asset or element(s). The metadata 118 may be used to improve the relevance and product the quality of tags, and may help a language model (LM) 134 infer tags more accurately and/or quickly.

In some embodiments, a statistics extractor 120 may generate statistics 122 about the data 105. Statistics 122 may include any numerical qualities about the data 105. Example statistics 122 include total number of data items for an asset/element, number of distinct values for each elements. For string data types, statistics 122 may include a max, min, and mean length. For number data types, statistics 122 may include a max, min, and mean value. Other embodiments, may include other types of data statistics 122 about the data 105, not limited to the examples described herein.

Statistics extractor 120 may generate and collect statistics 122 which may help provide additional information for generating or inferring tags. For example, TE 102 may use statistics 122 to help in distinguishing between types with repeated values (e.g., gender) and types with unique values (e.g., name or address). In some embodiments, the statistics 122 may be provided to LM 134, or may otherwise be used to enhance the accuracy, confidence, and/or efficiency of the tags that are generated by TE 102 via LM 134. For example, it may be beneficial for LM 134 and/or a sample size estimator 124 to know that a particular column includes ten unique data values across ten thousand rows of data.

In some embodiments, sample size estimator 124 may use these statistics 122, to make a more informed decision regarding generating an appropriate sample size 126. Sample size 126 may be an indication of how many data values or rows of data, and which rows of data, are to be selected or extracted from data 105, and provided to LM 134 which will then use the sample data 130 to generate tags for the entire data set 105.

For example, a table may include one million rows. Processing that one million rows of data would require enormous computing power and time to generate tags. The sample size 126 may be an indication of how many rows would be selected from data 105, by a data sampler 128 and used to generate tags. In some embodiments, sample size estimator 124 may use a fixed percentage (e.g., 18%) of the total number of rows. In some embodiments, sample size estimator may account for any or all statistics in computing the sample size 126, which may computed based in part on historical sample sizes for varying sized data sets.

In some embodiments, data sampler 128 may select sampled data 130 from data 105. In some embodiments, the sampled data 130 may include the first X number of rows that satisfy the sample size 126. In some embodiments, the sampled data 130 may be selected from throughout the data set, skipping some rows, and selecting others, e.g., through a random sampling. In some embodiments, a random number generator may be used to select which rows of data to use in the sample data 130.

In some embodiments, prompt builder 112 may receive the metadata 118, statistics 122, and sample data 130 to generate a prompt 114. In some embodiments, prompt builder 112 may also receive or access additional tag context 132 (referred to herein as context 132). Context 132 may include any information provided by a user or system that provides additional guidelines with regards to tags, such as which tags to use or avoid. In some embodiments, context 132 may include an indication as to the type of data 105 is that is being tagged (e.g., financial data, sales data, human resources data). Prompt builder 112 may include or incorporate context 132 within prompt 114, which may give a user additional control over what types of tags are generated by LM 134.

Prompt builder 112 may then generate a prompt 114. Prompt 114 may include a particular format based on and including at least part of the various input information (e.g., context 132, metadata 118, statistics 122, and sampled data 130) that is best-suited for providing instructions to a language model (LM) 134.

LM 134 may include a pre-trained transformer or artificial intelligence system that is configured or designed to perform various tasks based on provided input or prompts 114. In some embodiments, LM 134 may be a large-scale language model (LLM). LLM may include a larger number of model parameters and more robust training data relative to a general LM. While LM 134 may not require a particular format of input, prompt 114 as generated by prompt builder 112 may generate prompt 114 to be in a particular format (in accordance with a prompt template 113) that is easy for LM 134 to understand and produces reliable, accurate, and intended output (tags 136). In some embodiments, prompt template 113 may be generated as a result of repeated trials and tests with data and output by LM 134, tweaked in a format that is used to produce the intended output.

Output or tags 136 may include a list of tags for data 105, as generated by LM 134 in response to prompt 114, based on the sampled data 130. For example, tags 136 may include the various columns of a table with the appropriate tags or metadata describing the data in each column. In some embodiments, tags 136 may include a list of tags in a requested format. TE 102 may receive the output tags 136 and apply them to data 105, or the original input data 104 which may be stored in a database 138.

The data of the table of the database, including the tags 136, may then be queried 140 by TE 102, and the tags 136 may be used in processing the query 140 and returning a result 142. In some embodiments, the untagged data of database may not be queryable prior to the application of tags 136.

In some embodiments, the tags 136 may be combined with the tags generated by sensitive tag generator 108 for the sensitive data and applied to the data of a table of database 138. In some embodiments, the tags 136 (which may include or exclude the sensitive data tags) may be provided to a user for manual review, edit, and/or approval via a user interface. And upon user approval, the tags may then applied to the data of database 138.

Figure 2:
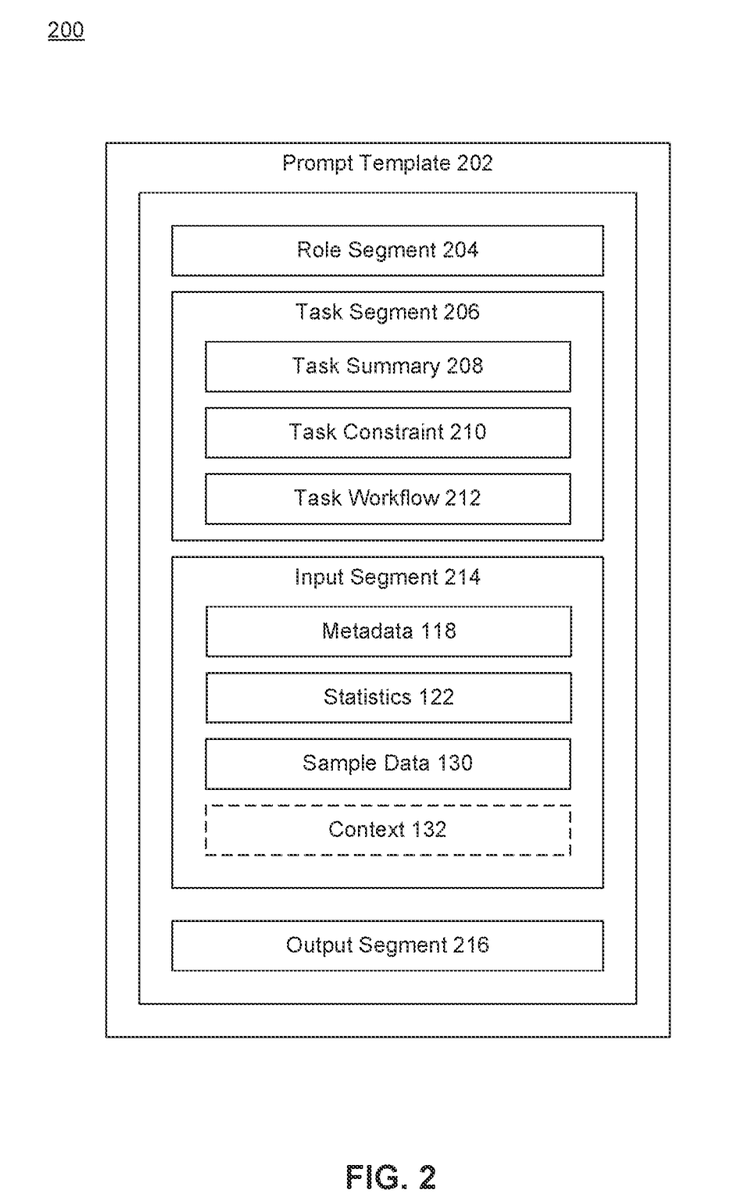
FIG. 2 is a block diagram illustrating an example prompt template, according to some embodiments.

FIG. 2 is a block diagram 200 illustrating an example prompt template 202, according to some embodiments. Prompt template 202 may be an example of prompt template 113 (of FIG. 1) and may be used by prompt builder 112 to generate a prompt 114 for LM 134. In some embodiments, the prompt template 202 may be configured and designed to work specifically with LM 134, through repeated and iterative testing, to optimize the output/tags 136 generated by LM 134 based on sets of sample data. In some embodiments, prompt builder 112 may be configured with different prompt templates 202 for different artificial intelligence or language model (LM) systems 134. The example prompt template 202 includes various segments, however it is understood that in other embodiments, the prompt template 202 may include segments in addition to or different from those described below.

A role segment 204 may define a role of the LM 134 within the tagging process. As noted above, an LM 134 may be able to perform a wide variety of tasks. Role segment 204 may include an instruction to LM 134 communicating that the process of LM 134 is to perform tagging based on of the provided sample data 130. An example role segment 204, may include a particular role for the LM 134 through which to analyze the sample data 130. Example roles may include business analyst, engineer, data scientist, data modeler, data analyst, chief executive, etc. In some embodiments, the role segment 204 may include the instruction "You are a data analyst responsible for auto-tagging the given data."

In some embodiments, role segment 204 may be identical across various prompts 114 generated by prompt builder 112 using the same prompt template 202, even if different data is being provided. Or, for example, role segment 204 may be identical if the asset/element structure of the data is identical. For example, if the data includes a single table, then the role segment 204 may be the same regardless of the table size or contents. If the data however, includes multiple tables, then the role segment 204 my different relative to if the data included a single table. In some embodiments, the role segment 204 may be any instruction, command, or request for LM 134 to generate or infer tags for provided based on instructions.

A task segment 206 may provide the primary details or instructions regarding what operations are to be performed by LM 134. The role segment 204, as referenced above, may include some additional tagging or other activity instruction in addition to what is provided in the task segment 206. In some embodiments, the task segment 206 may include task summary 208 and task constraint 210. The task summary 208 may provide a simple description about the task. For example, task summary 208 may indicate the name of table in database 138, and indicate a request to tag each column of the table, or a specific subset of the columns.

The task constraint 210 may include one or more constraints or limitations for tagging the data. For example, task constraints 210 may include a particular tag or label that must be used or avoided. As an example, tag constraints 210 may specify that if any of the data has name type data, LM 134 is to use the tag "employee name" instead of a generic "name" tag. Or for example, tag constraints 210 may indicate that no tag can include more than 20 characters, or cannot use the word "number" (e.g., such as social security number or phone number).

In some embodiments, task segment 206 may include a task workflow 212. Task workflow 212 may indicate how many rounds of tagging may be performed by LM 134. For example, if there is not enough sample data 130 provided to prompt builder 112 in a first round of tagging, prompt builder 112 may be able to request additional sample data 130. In some embodiments, task workflow 212 may specify how much additional data (e.g., 50% more, 100% more, X additional number of rows, etc.). Task workflow 212 is described in greater detail below with regard to FIG. 3.

Input segment 214 may include the various data described above that is provided to prompt builder 112, which may include metadata 118, statistics 122, and sample data 130. In some embodiments, input segment 214 may also include the additional tag context 132, if provided by a user or system.

Output segment 216 may indicate the desired outcome of the tagging process, or activity specified by role segment 204 and task segment 206. The output segment 216 may indicate what output is required or requested, such as tags for the columns and confidence values which may indicate the certainty of the tags as computed by LM 134. In some embodiments, output segment 216 may specify a format for output, such as a Javascript Object Notation (JSON) file.

Figure 3:
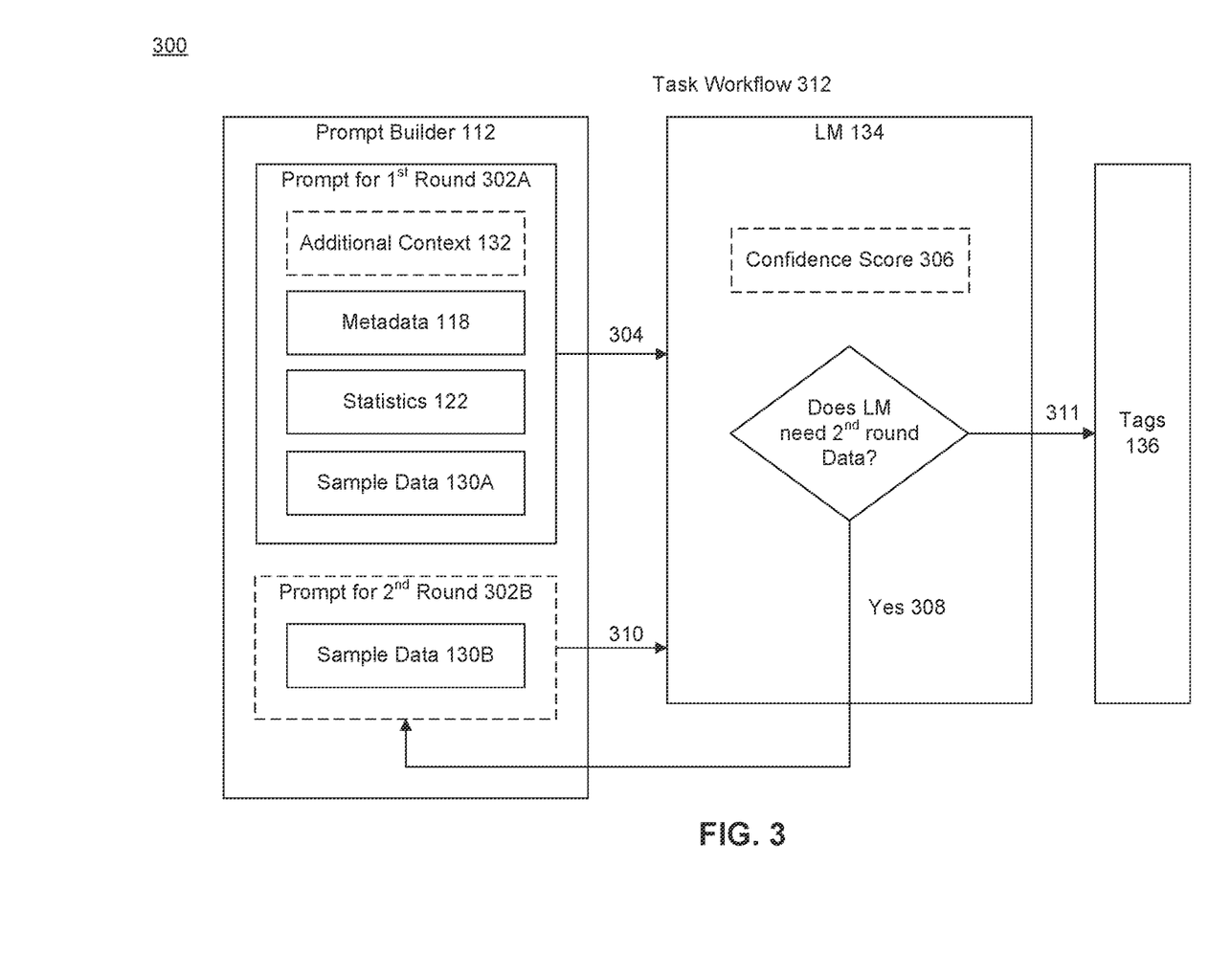
FIG. 3 illustrates an example flowchart, illustrating a task workflow, according to some embodiments.

FIG. 3 illustrates an example flowchart 300, illustrating a task workflow 312, according to some embodiments. Task workflow 312 may illustrate what information may be provide in task workflow 212, as described above, and the result of task workflow 212.

Prompt builder 112 may generate a first prompt 302A (which may be an example of prompt 114) for a first round for processing. In some embodiments, prompt 302A may include or be provided with additional context 132, metadata 118, statistics 122, and a first set of sample data 130A. At 304, prompt 302A may be provided to LM 134 for tagging.

During the tagging process, LM 134 may determine that additional data may be helpful or required to more accurately tag the data. For example, a confidence score 306 generated by LM 134 for one or more tags may be below a specified threshold (which may be a pre-defined value or may be a value provided with prompt 302A, unique for each tagging request). Then, for example, LM 134 may check task workflow 212 to determine whether additional data for a second round of tag processing is available. If LM 134 both needs additional data and there is a second or additional round of tag processing according to task workflow 212, then at 308 LM 134 may request new or additional sample data from prompt builder 112.

Using a similar process as described above, prompt builder 112 may generate a new or second set of sample data 130B (which will include different data relative to the previously provided sample data 130A) and provide the second set of sample data 130B to LM 134. In some embodiments, the second set of sample data 130B may include all the data not included with sample data 130A, or some percentage of the remaining data as described above. In some embodiments, the second set of sample data 130B may be the same size as sample size 126, or may be some percentage of the sample size 126 (e.g., 50%, 100%, or 200% as examples). Prompt builder 112 may not need to generate provide any additional information, such as metadata 118, statistics 122, or additional context 132, since all this information was provided with prompt 302A (and this may save processing and network bandwidth). At 310, the second prompt 302B may be provided to LM 134. LM 134 may then combine the second set of sample data 130B with the first set of sample data 130A, and at 311 generate tags 136 (e.g., output).

In some embodiments, task workflow 212 may limit LM 134 to two rounds of sample data. In other embodiments, task workflow 212 may allow as many rounds as may be necessary to reach, or exceed a specified confidence score in the tags 136. If at the first round of processing, if the confidence score 306 exceeds the threshold or there are no additional rounds of sample data available, LM 134 may generate tags 136 with the available data.

Figure 4:
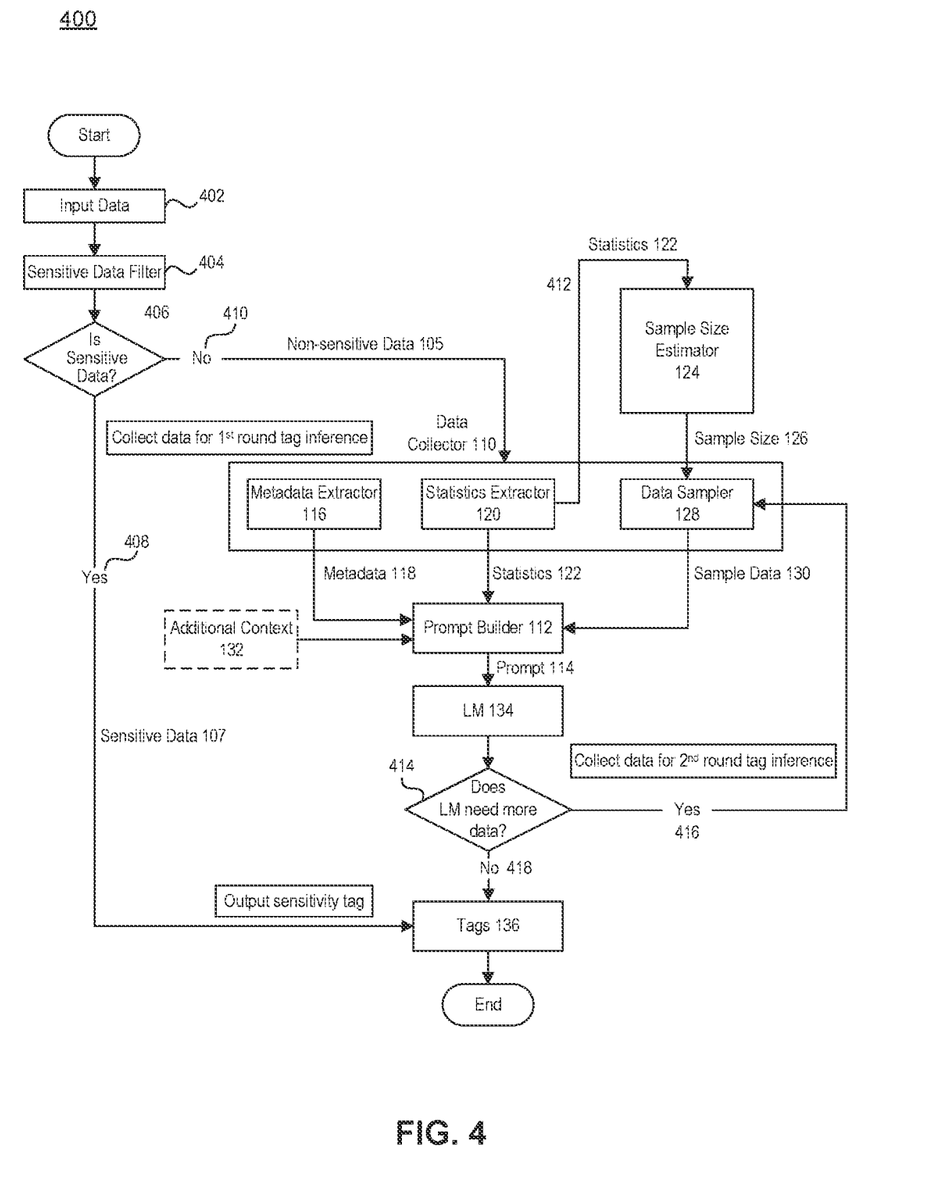
FIG. 4 illustrates an example flowchart, illustrating example operations of tag engine (TE), according to some embodiments.

FIG. 4 illustrates an example flowchart 400, illustrating example operations of tag engine (TE) 102, according to some embodiments.

At 402, input data 104 is received. At 404, a sensitive data filter 106 receives the input data, and at 408, the sensitive data filter 106 identifies and filters out any sensitive data 107. At 408, sensitive data 107, which may be separated from the non-sensitive data 105, may be tagged as sensitive data by a sensitive tag generator 108.

At 410, the non-sensitive data 105 is provided to data collector 110. As described above, metadata extractor may retrieve or extract metadata 118 and statistics extractor 120 calculate statistics for the data 105 and/or global statistics across multiple data sets. For example, the statistics extractor 120 may store statistics 122 from previous data sets that have been processed, and combine the stored statistics 122 with new statistics from or incorporating the current data set 105.

At 412, the statistics 122 may be provided to a sample size estimator 124 to generate a first sample size 126. And data sampler 128 may generate a first data sample 130 based on the sample size 126. Prompt builder 112 may receive the sample data 130, statistics 122, and metadata 118, as well as any additional context 132 and generate a prompt 114 that is then provided to LM 134.

At 414, if additional data is required to perform or complete the tagging process, then at 416 a new data sample may be requested, generated, and provided to LM 134. At 418, the tagged data may be combined with the sensitive data into a final output of tags 136.

Figure 5:
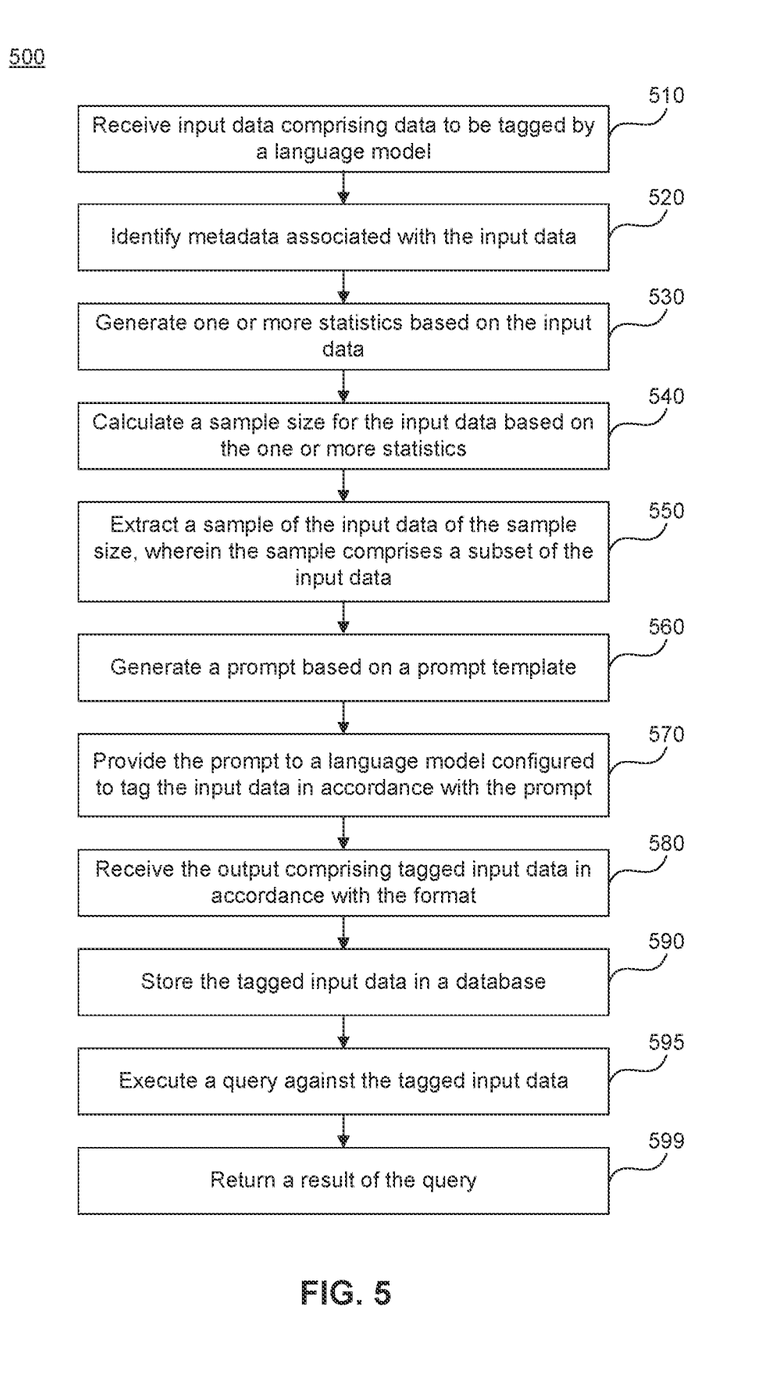
FIG. 5 is a flowchart illustrating example operations for providing data tagging and prompt generation by a tag engine (TE), according to some embodiments.

FIG. 5 is a flowchart 500 illustrating example operations for providing data tagging and prompt generation by a tag engine (TE) 102, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to FIG. 1.

In 510, input data comprising data to be tagged by a language model is received. For example, TE 102 may receive input data 104.

In 520, metadata associated with the input data is identified. For example, metadata extractor 116 may identify and/or extract metadata 118 from input data 104. In some embodiments, the metadata 118 may include a table and/or one or more existing column names.

In 530, one or more statistics are generated based on the input data. For example, statistics extractor 120 may generate statistics 122 based on the input data 104. In some embodiments, the statistics 122 may include a total number of data items in the input data (e.g., such as the number of rows or unique data values).

In 540, a sample size for the input data is calculated based on the one or more statistics. For example, sample size estimator 124 may calculate a sample size 126 based on the statistics 122.

In 550, a sample of the input data of the sample size, wherein the sample comprises a subset of the input data. For example, data sampler 128 may extract sample data 130 from non-sensitive data 105 based on the sample size 126.

In 560, a prompt is generated based on a prompt template. For example, prompt builder 112 may generate a prompt 114 based on a prompt template 113. The prompt template 113 may include an input segment 214 including the metadata 118 and sample data 130, and an output segment 216 identifying a format for an output 136.

In 570, the prompt is provided to a language model configured to tag the input data in accordance with the prompt. For example, prompt 114 may be provided to LM 134, which may generate tags 136 based on sample data 130 which may be applied to the input data 104 by TE 102. In some embodiments, LM 134 may be an external system, connected to TE 102 via a network, and may be accessible to other computing systems. And thus to protect sensitive data 107, the sensitive data 107 may be masked or not provided to LM 134 at all for tagging.

In 580, the output comprising tagged input data in accordance with the format is received. For example, TE 102 may receive output or tags 136 from LM 134.

In 590, the tagged input data is stored in a database. For example, TE 102 may apply tags 136 to the table from which input data 104 was extracted in database 138.

In 595, a query is executed against the tagged input data. For example, TE 102 or database 138 may execute a query 140 against the newly tagged data table of database 138, using tags 136.

In 599, a result of the query is returned. For example, database 138 may generate a result 142 which may be returned to a user or a requesting system.

Figure 6:
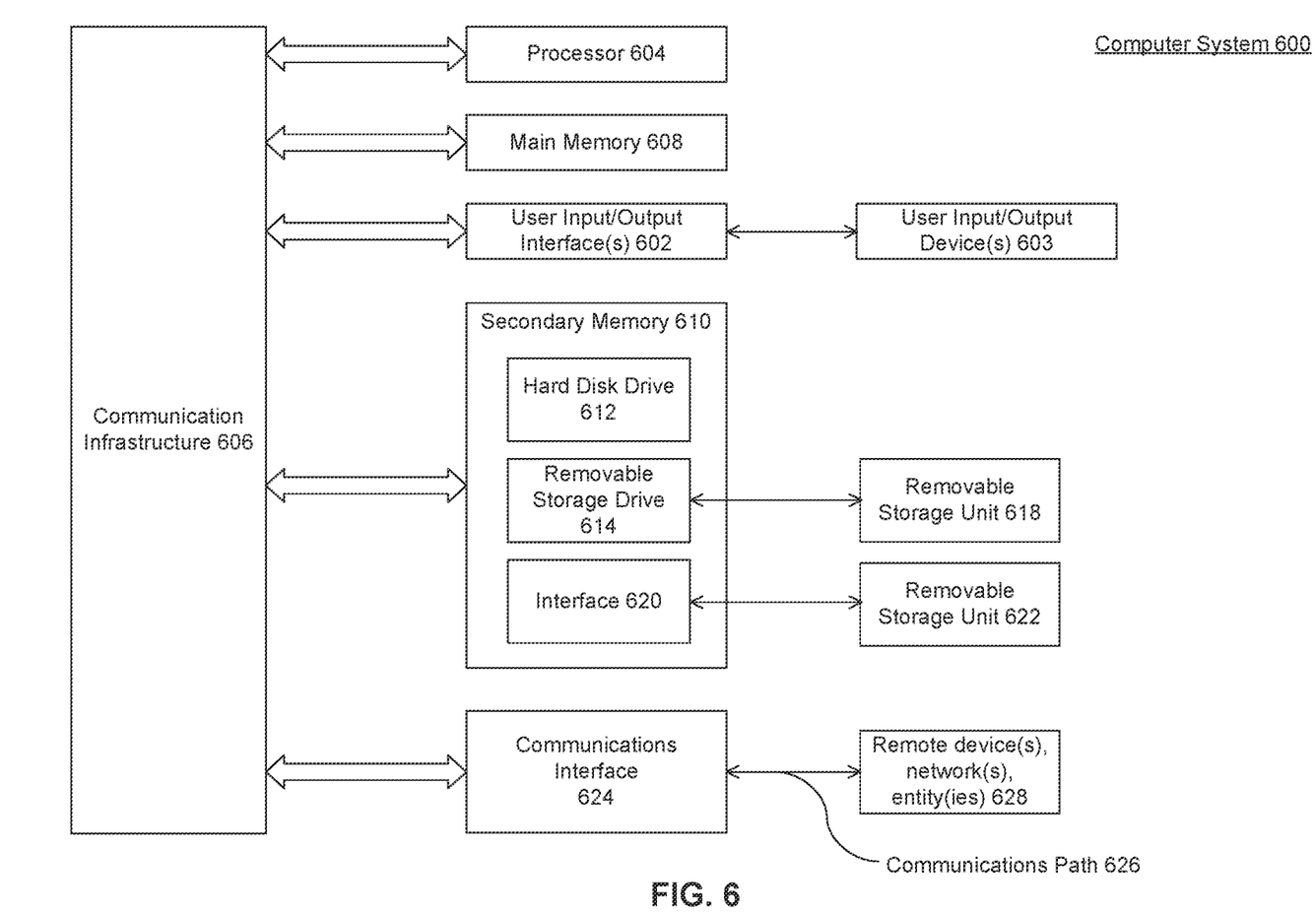
FIG. 6 is example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include customer input/output device(s) 603, such as monitors, keyboards, pointing devices, etc., which may communicate with communication infrastructure 606 through customer input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:
1. A method comprising:
receiving, by one or more processors, input data comprising data to be tagged by a language model;
identifying metadata associated with the input data, wherein the metadata comprises a name by which to refer to the input data;
generating one or more statistics based on the input data, the one or more statistics comprising a total number of data items in the input data;

calculating a sample size for the input data based on the one or more statistics, wherein the sample size is less than the total number of data items in the input data;

extracting a sample of the input data in accordance with the sample size, wherein the sample of the input data comprises a subset of the input data;

generating a prompt based on a prompt template, the prompt template comprising an input segment comprising the metadata and the sample of the input data, and an output segment identifying a format for an output;

providing the prompt to the language model configured to generate one or more tags based on the sample of the input data, and tag the input data with the one or more tags in accordance with the prompt;

receiving the output comprising tagged input data which was tagged with one or more tags generated based on the sample of the input data and in accordance with the format, wherein the tagged input data includes a semantic meaning or semantic context of the input data;

storing the tagged input data in a database;

executing a query against the tagged input data stored in the database; and returning a result of the query.

2. The method of claim 1, wherein the receiving comprises:

identifying sensitive data and non-sensitive data from the input data;

extracting the sensitive data, wherein only the non-sensitive data is provided to the language model; and tagging the sensitive data independently of the output.

3. The method of claim 1, wherein the language model comprises an artificial intelligence language model configured to perform a variety of tasks including tagging the input data, and wherein the artificial intelligence language model is operating one or more different processors.

4. The method of claim 1, further comprising:

receiving a request for additional data, after providing the prompt and prior to receiving the output;

extracting a second sample of the input data in accordance with the sample size; and generating a second prompt comprising the second sample; and providing the second prompt including the second sample to the language model.

5. The method of claim 4, wherein the second sample is a same size as the sample size.

6. The method of claim 1, wherein the input data comprises a table from a database, the table comprising a plurality of columns, each column including a plurality of rows.

7. The method of claim 6, wherein at least a subset of the plurality of columns from the table include tags generated by the language model.

8. A system comprising:

a memory; and at least one processor coupled to the memory and configured to perform operations comprising:

receiving input data comprising data to be tagged by a language model;

identifying metadata associated with the input data, wherein the metadata comprises a name by which to refer to the input data;

generating one or more statistics based on the input data, the one or more statistics comprising a total number of data items in the input data;

calculating a sample size for the input data based on the one or more statistics, wherein the sample size is less than the total number of data items in the input data;

extracting a sample of the input data in accordance with the sample size, wherein the sample of the input data comprises a subset of the input data;

generating a prompt based on a prompt template, the prompt template comprising an input segment comprising the metadata and the sample of the input data, and an output segment identifying a format for an output;

providing the prompt to the language model configured to generate one or more tags based on the sample of the input data, and tag the input data with the one or more tags in accordance with the prompt;

receiving the output comprising tagged input data which was tagged with one or more tags generated based on the sample of the input data and in accordance with the format, wherein the tagged input data includes a semantic meaning or semantic context of the input data;

storing the tagged input data in a database;

executing a query against the tagged input data stored in the database; and returning a result of the query.

9. The system of claim 8, wherein the receiving comprises:

identifying sensitive data and non-sensitive data from the input data;

extracting the sensitive data, wherein only the non-sensitive data is provided to the language model; and tagging the sensitive data independently of the output.

10. The system of claim 8, wherein the language model comprises an artificial intelligence language model configured to perform a variety of tasks including tagging the input data, and wherein the artificial intelligence language model is operating one or more different processors.

11. The system of claim 8, the operations further comprising:

receiving a request for additional data, after providing the prompt and prior to receiving the output;

extracting a second sample of the input data in accordance with the sample size; and generating a second prompt comprising the second sample; and providing the second prompt including the second sample to the language model.

12. The system of claim 11, wherein the second sample is a same size as the sample size.

13. The system of claim 8, wherein the input data comprises a table from a database, the table comprising a plurality of columns, each column including a plurality of rows.

14. The system of claim 13, wherein at least a subset of the plurality of columns from the table include tags generated by the language model.

15. A non-transitory computer-readable device having instructions stored thereon that, when executed by at least one computing device, cause the at least one computing device to perform operations comprising:

receiving input data comprising data to be tagged by a language model;

identifying metadata associated with the input data, wherein the metadata comprises a name by which to refer to the input data;

generating one or more statistics based on the input data, the one or more statistics comprising a total number of data items in the input data;

calculating a sample size for the input data based on the one or more statistics, wherein the sample size is less than the total number of data items in the input data;

extracting a sample of the input data in accordance with the sample size, wherein the sample of the input data comprises a subset of the input data;

generating a prompt based on a prompt template, the prompt template comprising an input segment comprising the metadata and the sample of the input data, and an output segment identifying a format for an output;

providing the prompt to the language model configured to generate one or more tags based on the sample of the input data, and tag the input data with the one or more tags in accordance with the prompt;

receiving the output comprising tagged input data which was tagged with one or more tags generated based on the sample of the input data and in accordance with the format, wherein the tagged input data includes a semantic meaning or semantic context of the input data;

storing the tagged input data in a database;

executing a query against the tagged input data stored in the database; and returning a result of the query.

16. The non-transitory computer-readable device of claim 15, wherein the receiving comprises:
identifying sensitive data and non-sensitive data from the input data;
extracting the sensitive data, wherein only the non-sensitive data is provided to the language model; and
tagging the sensitive data independently of the output.

17. The non-transitory computer-readable device of claim 15, wherein the language model comprises an artificial intelligence language model configured to perform a variety of tasks including tagging the input data, and wherein the artificial intelligence language model is operating one or more different processors.

18. The non-transitory computer-readable device of claim 15, the operations further comprising:
receiving a request for additional data, after providing the prompt and prior to receiving the output;
extracting a second sample of the input data in accordance with the sample size; and
generating a second prompt comprising the second sample; and
providing the second prompt including the second sample to the language model.

19. The non-transitory computer-readable device of claim 18, wherein the second sample is a same size as the sample size.

20. The method of claim 7, wherein a first tag of the one or more tags is used as a column name of a first column of the plurality of columns.

* * * * *